(12) United States Patent
Batni et al.

(10) Patent No.: US 7,376,419 B2
(45) Date of Patent: May 20, 2008

(54) CALL TRIGGERING TO ONE OR MORE SERVICE NODES UPON RECEIPT OF INITIAL TRIGGER RESPONSE

(75) Inventors: Ramachendra P. Batni, Phoenix, AZ (US); Michael Joseph Rudolph, Naperville, IL (US); Yile E. Wang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 546 days.

(21) Appl. No.: 10/767,101

(22) Filed: Jan. 28, 2004

(65) Prior Publication Data

US 2005/0164707 A1 Jul. 28, 2005

(51) Int. Cl.
*H04Q 7/20* (2006.01)
*H04M 3/42* (2006.01)
*H04M 11/00* (2006.01)
*H04M 15/00* (2006.01)

(52) U.S. Cl. .................. 455/428; 455/414.1; 455/406; 455/408; 379/114.2

(58) Field of Classification Search ................ 455/428, 455/414.1, 406, 408; 379/114.2, 218.01
See application file for complete search history.

(56) References Cited

U.S. PATENT DOCUMENTS

| | | | | |
|---|---|---|---|---|
| 5,835,856 | A * | 11/1998 | Patel | 455/406 |
| 5,898,917 | A * | 4/1999 | Batni et al. | 455/564 |
| 5,999,610 | A * | 12/1999 | Lin et al. | 379/207.02 |
| 6,044,274 | A * | 3/2000 | Vo et al. | 455/461 |
| 6,075,982 | A * | 6/2000 | Donovan et al. | 455/406 |
| 6,236,857 | B1 * | 5/2001 | Calabrese et al. | 455/426.1 |
| 6,292,656 | B1 * | 9/2001 | Donovan et al. | 455/406 |
| 6,373,930 | B1 * | 4/2002 | McConnell et al. | 379/114.28 |
| 6,615,042 | B1 * | 9/2003 | Britt et al. | 455/433 |
| 2003/0022669 | A1 * | 1/2003 | Aitken et al. | 455/432 |
| 2004/0058665 | A1 * | 3/2004 | Batni et al. | 455/403 |
| 2004/0240646 | A1 * | 12/2004 | O'Donnell | 379/114.2 |
| 2005/0130624 | A1 * | 6/2005 | Batni et al. | 455/406 |
| 2005/0262020 | A1 * | 11/2005 | Karlsson | 705/41 |

FOREIGN PATENT DOCUMENTS

GB 2344490 A * 6/2000

* cited by examiner

*Primary Examiner*—Lester G. Kincaid
*Assistant Examiner*—Marisol Figueroa

(57) ABSTRACT

An originating mobile switching center of an apparatus in one example handles one or more calls. A serving mobile switching center for a communication device on a call of the one or more calls passes control of the call to the originating mobile switching center. The originating mobile switching center triggers the call to a service node. The service node sends an initial trigger response to the originating mobile switching center that instructs the originating mobile switching center to redirect the call. The initial trigger response arms one or more triggers that support one or more services for the communication device. The one or more triggers comprise one or more of one or more switch based triggers and one or more subscriber based triggers exclusive of Calling_Routing_Addresss_Available, OAnswer, and ODisconnect triggers. Upon receipt of the initial trigger response, the originating mobile switching center encounters one or more of the one or more triggers and triggers the call to one or more other service nodes.

21 Claims, 5 Drawing Sheets

CALL TRIGGERING TO ONE OR MORE SERVICE NODES UPON RECEIPT OF INITIAL TRIGGER RESPONSE

CROSS-REFERENCE TO RELATED APPLICATIONS

This application contains subject matter that is related to the subject matter of the following applications, which is assigned to the same assignee as this application. The below-listed applications are hereby incorporated herein by reference in their entirety.

"MOBILE STATION ORIGINATION WHEN SERVING MOBILE SWITCHING CENTER IS NOT WIRELESS INTELLIGENT NETWORK CAPABLE," by Batni, et al., Ser. No. 10/253,090, filed Sep. 24, 2002.

"GENERATING ONE OR MORE TRIGGERED OPERATIONS TO PREPAID SERVICE NODE BASED ON CONNECTION WITH INTELLIGENT PERIPHERAL COMPONENT," by Batni, et al., Ser. No. 10/736,256, filed Dec. 15, 2003.

TECHNICAL FIELD

The invention relates generally to communications and more particularly to originating mobile switching center interaction with service nodes.

BACKGROUND

In a telecommunication network, a user associated with a prepaid mobile communication device may fund an account balance employable for subsequent telecommunication service. For example, the telecommunication network provides the prepaid mobile communication device with prepaid telecommunication service. A prepaid service node maintains the account balance for the prepaid mobile communication device. For example, the prepaid service node calculates billing information for telecommunication service used by the prepaid mobile communication device. The billing information in one example comprises an amount to deduct from the account balance associated with the prepaid mobile communication device. The prepaid mobile communication device in one example is connected with a destination location on a telephone call for a duration. The prepaid service node calculates the amount to deduct from the account balance based on the destination location and duration of the telephone call.

The telecommunication network may offer additional services in addition to supporting telephone calls. For example, the telecommunication network may offer directory information, weather reports, horoscopes, and/or stock quotes through connection with one or more service nodes. The telecommunication network in one example connects mobile communication devices to the service nodes upon receipt of specific dialed number strings from the mobile communication devices.

The telecommunication network in one example comprises a serving mobile switching center responsible for triggering calls to the service nodes. However, the serving mobile switching center may not be able to support call triggers. Thus, to trigger calls to the service nodes, the serving mobile switching center may pass control of the call to an originating mobile switching center that supports call triggers. The originating mobile switching center connects the mobile communication device with the service nodes.

In one example, the originating mobile switching center triggers the call to one or more of the service nodes. However, the originating mobile switching center does not receive a trigger address list from a home location register upon registration of the mobile communication device. As one shortcoming, the originating mobile switching center may not have a complete list of call triggers required to connect the mobile communication device with the service nodes.

In another example, one or more of the service nodes hairpin (e.g., bridge) the call. For example, to connect the call with a service node, the originating mobile switching center connects a first call leg with the service node. The service node connects a second call leg back to the originating mobile switching center to continue the call. The service node bridges the first and second call legs together. The service node remains in a path of the call for a duration of the call. As another shortcoming, each of the call legs consume telecommunication network resources for the duration of the call.

Thus, a need exists for a telecommunication network that provides an enhanced communication between service nodes.

SUMMARY

The invention in one embodiment encompasses an apparatus. The apparatus comprises an originating mobile switching center that handles one or more calls. A serving mobile switching center for a communication device on a call of the one or more calls passes control of the call to the originating mobile switching center. The originating mobile switching center triggers the call to a service node. The service node sends an initial trigger response to the originating mobile switching center that instructs the originating mobile switching center to redirect the call. The initial trigger response arms one or more triggers that support one or more services for the communication device. The one or more triggers comprise one or more of one or more switch based triggers and one or more subscriber based triggers exclusive of Calling_Routing_Addresss_Available, OAnswer, and ODisconnect triggers. Upon receipt of the initial trigger response, the originating mobile switching center encounters one or more of the one or more triggers and triggers the call to one or more other service nodes.

Another embodiment of the invention encompasses a method. Control of a call is received from a serving mobile switching center. The call is triggered to a service node that employs an initial trigger response to arm one or more triggers. The one or more triggers comprise one or more of one or more switch based triggers and one or more subscriber based triggers exclusive of Calling_Routing_Addresss_Available, OAnswer, and ODisconnect triggers. One or more of the one or more triggers associated with one or more other service nodes is encountered. The call is triggered to one or more of the one or more other service nodes upon receipt of the initial trigger response.

Yet another embodiment of the invention encompasses an article. The article comprises one or more computer-readable signal-bearing media. The article comprises means in the one or more media for receiving control of a call from a serving mobile switching center. The article comprises means in the one or more media for triggering the call to a service node that employs an initial trigger response to arm one or more trigger. The one or more triggers comprise one or more of one or more switch based triggers and one or more subscriber based triggers exclusive of Calling_Routing_Addresss_Available, OAnswer, and ODisconnect triggers. The article comprises means in the one or more media for encountering one or more of the one or more triggers associated with one or more other service nodes. The article comprises means in the one or more media for triggering the call to one or more of the one or more other service nodes upon receipt of the initial trigger response.

DESCRIPTION OF THE DRAWINGS

Features of exemplary implementations of the invention will become apparent from the description, the claims, and the accompanying drawings in which:

DETAILED DESCRIPTION

Figure 1:
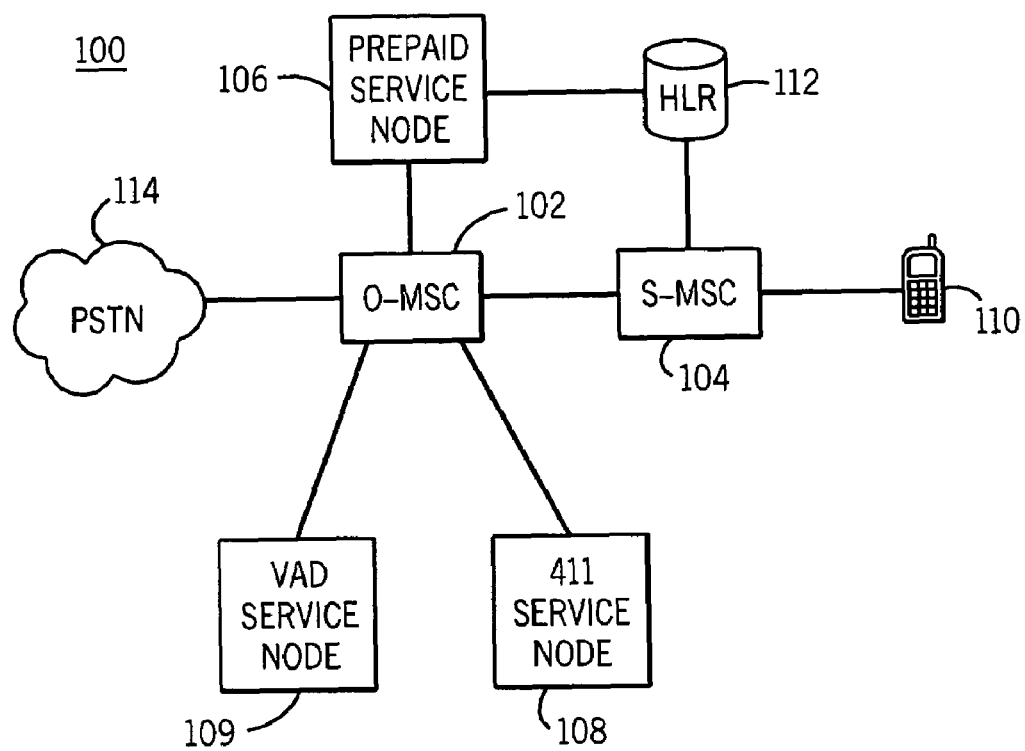
FIG. 1 is a representation of an exemplary implementation of an apparatus that comprises one or more originating mobile switching centers, one or more serving mobile switching centers, one or more service nodes, one or more mobile communication devices, one or more home location registers, and one or more public switched telephone networks.

Turning to FIG. 1, an apparatus 100 in one example comprises one or more originating mobile switching centers ("O-MSCs") 102, one or more serving mobile switching centers ("S-MSCs") 104, one or more service nodes 106, 108, and 109, one or more mobile communication devices 110, one or more home location registers ("HLRs") 112, and one or more public switched telephone networks ("PSTNs") 114. The apparatus 100 illustrates a use of mobile switching center and other wireless network element (e.g., the home location register 112) operations, in accordance with, and in addition to American National Standards Institute ("ANSI-41") and Wireless Intelligent Network ("WIN") standards, to provide a charging capability for transactions with the service nodes 106, 108, and 109.

The originating mobile switching center 102 handles one or more calls. For example, the originating mobile switching center 102 supports call delivery for the mobile communication device 110. The serving mobile switching center 104 supports an air interface with the mobile communication device 110. The originating mobile switching center 102 serves to connect the mobile communication device 110 with one or more termination endpoints during a communication session. In one example, the originating mobile switching center 102 connects the mobile communication device 110 with the public switched telephone network 114. In another example, the originating mobile switching center 102 connects the mobile communication device 110 with one or more of the service nodes 106, 108, and 109.

The serving mobile switching center 104 in one example passes control of a call to the originating mobile switching center 102. For example, the serving mobile switching center 104 hotlines the call to the originating mobile switching center 102. The serving mobile switching center 104 in one example does not support call triggers and the originating mobile switching center 102 does support call triggers for the call. Thus, to allow call triggering for connections with the service nodes 106, 108, and 109, the serving mobile switching center 104 transfers control of the call to the originating mobile switching center 102.

The service nodes 106, 108, and 109 in one example each comprise an intelligent peripheral component ("IP") and a service control point ("SCP"). The service nodes 106, 108, and 109 in one example provide services to the mobile communication device 110. The services of the service nodes 106, 108, and 109 in one example may be combined or divided. For example, one or more service platforms may host the services of the service nodes 106, 108, and 109.

The service node 106 in one example comprises a prepaid service node 106. The mobile communication device 110 may incur a fee during use of the service nodes 108 and 109 and the prepaid service node 106 may bill the mobile communication device 110 for using the services. To facilitate billing the mobile communication device 110 for use of the services, the service nodes 106, 108, and 109 send service identifications that are associated with the service nodes 106, 108, and 109 to the originating mobile switching center 102 to indicate the use of the services during a communication session. The originating mobile switching center 102 will store the service identifications for later delivery to the prepaid service node 106.

If the originating mobile switching center 102 receives a service identification that does not match a prearranged value, then the originating mobile switching center 102 will record the service identification in automatic message accounting ("AMA") records. Thus, the originating mobile switching center 102 compiles a list of all received service identifications during the communication session. Then, the originating mobile switching center 102 may later send the list of received service identifications to the prepaid service node 106. The list of received service identifications is employable by the prepaid service node 106 to calculate billing information based on use of the service nodes 108 and 109 by the mobile communication device 110. For example, the service nodes 108 and 109 may thus communicate the service identifications to the prepaid service node 106 without requiring the service nodes 108 and 109 to know which subscribers are prepaid subscribers.

The prepaid service node 106 handles billing for services used by the mobile communication device 110 during a communication session. The prepaid service node 106 employs the service identifications, billing rates, and call durations to calculate billing information for the communication session. The billing information in one example comprises an amount to deduct from an account balance associated with the mobile communication device 110. The prepaid service node 106 in one example sends service identifications to the originating mobile switching center 102 to indicate a service provided to the mobile communication device 110.

The service nodes 108 and 109 provide one or more services to the mobile communication device 110 during a communication session. The service node 108 in one example provides one or more of a directory assistance service (e.g., 411 service), a horoscope service, a weather report service, a stock quote service, and the like. In one example, the service node 108 comprises a directory assistance service node 108 that provides directory assistance service to the mobile communication device 110. In one example, the service node 109 comprises a voice activated dialing service node 109 that provides voice activated dialing service to the mobile communication device 110.

In one example, the directory assistance service node 108 provides directory assistance services as well as additional services. For example, the directory assistance service node 108 may support the horoscope service, the weather report service, and the stock quote service. The directory assistance service node 108 in one example employs a different service identification for each of the supported services to be able to indicate use of a plurality of the services. For example, the directory assistance service node 108 sends one or more different service identifications to the originating mobile switching center 102 to indicate which of the supported services were used by the mobile communication device 110 on the communication session. Thus, the originating mobile switching center 102 can pass the one or more different service identifications to the prepaid service node 106 for billing the mobile communication device 110.

The mobile communication device 110 in one example comprises a prepaid mobile communication device. For example, the prepaid mobile communication device 110 comprises a mobile telephone with an associated prepaid telephone service account. The prepaid telephone service account comprises an account balance used to fund subsequent telecommunication service. The home location register 112 stores subscription properties for the prepaid mobile communication device 110. Upon registration of the prepaid mobile communication device 110 with the serving mobile switching center 104, the home location register 112 communicates one or more portions of the subscription properties to the serving mobile switching center 104. The serving mobile switching center 104 employs the subscription properties for communication session setup.

Figure 2:
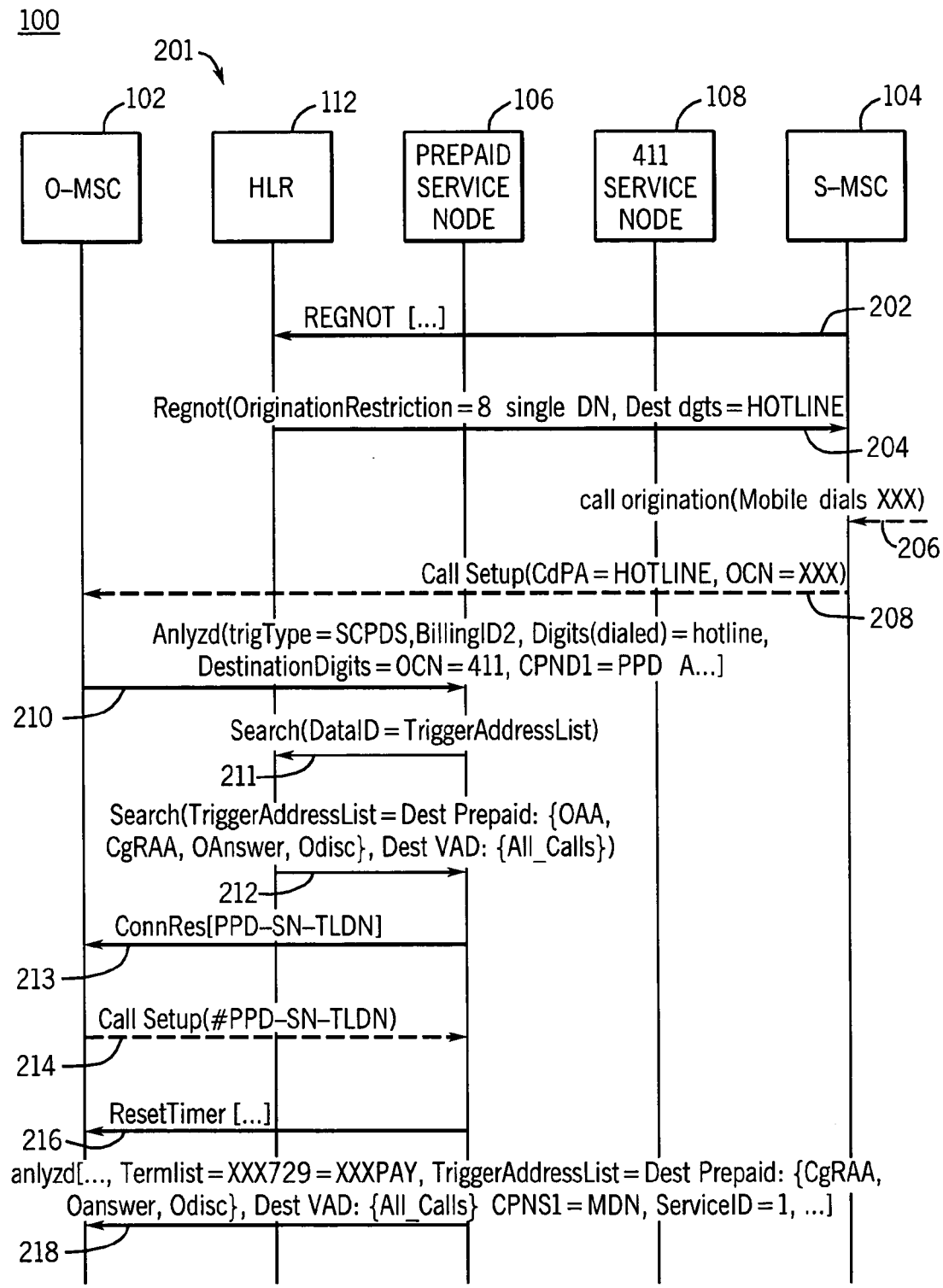
FIG. 2 is a representation of one exemplary message flow for transfer of control of a call from a serving mobile switching center of the one or more serving mobile switching switching centers of the apparatus of FIG. 1.

Referring to FIGS. 1-2, an illustrative description of one exemplary operation of the apparatus 100 is now presented, for explanatory purposes. A message flow 201 represents an exemplary transfer of control of a call from the serving mobile switching center 104 to the originating mobile switching center 102. The message flow 201 also illustrates the originating mobile switching center 102 triggering the call to the prepaid service node 106.

Upon registration of the prepaid mobile communication device 110 with the serving mobile switching center 104, the serving mobile switching center 104 sends a registration notification message 202 to the home location register 112. "REGNOT" serves to represent the registration notification message 202. The home location register 112 determines that the prepaid mobile communication device 110 employs prepaid telecommunication service. The home location register 112 also determines that the serving mobile switching center 104 does not support call triggers for the call. Thus, the home location register 112 in one example does not arm call triggers at the serving mobile switching center 104.

The home location register 112 sends a registration notification return result message 204 to the serving mobile switching center 104. "Regnot" serves to represent the registration notification return result message 204. The home location register 112 sets the destination digits in the registration notification return result message 204 to pass control of the call to the originating mobile switching center 102. For example, the home location register 112 sets the destination digits to "HOTLINE." Thus, upon attempt to setup a call from the prepaid mobile communication device 110, the serving mobile switching center 104 sends the call to the originating mobile switching center 102. This effectively passes control of the call from the serving mobile switching center 104 to the originating mobile switching center 102.

Upon an origination 206 of a call by the prepaid mobile communication device 110, the serving mobile switching center 104 sends the call to the originating mobile switching center 102. For example, the user of the prepaid mobile communication device 110 dials "XXX" to initiate the call. "OCN-XXX" serves to represent a dialed digit string to initiate the call. In one example, the dialed digit string comprises "411" to initiate a call to the directory assistance service node 108. The serving mobile switching center 104 initiates a call setup 208 with the originating mobile switching center 102. For example, the serving mobile switching center 104 hotlines the call to the originating mobile switching center 102.

The call setup 208 comprises an indication to the originating mobile switching center 102 to trigger the call to the prepaid service node 106. For example, the originating mobile switching center 102 encounters a Specific_Calling_Party_Digit_String ("SCPDS") trigger in response to the call setup 208. The originating mobile switching center 102 sends an AnalyzedInformation operation 210 to the prepaid service node 106 to involve the prepaid service node 106 on the call.

To determine subscriber properties associated with the prepaid mobile communication device 110, the prepaid service node 106 sends a search operation 211 to the home location register 112. The search operation 211 requests a TriggerAddressList from the home location register 112. The home location register 112 sends a search operation return result 212 to the prepaid service node 106. The search operation return result 212 comprises the TriggerAddressList. The TriggerAddressList in one example comprises Origination_Attempt_Authorized ("OAA"), Calling_Routing_Addresss_Available ("CgRAA"), OAnswer, Odisconnect, and All_Calls triggers. For example, the search operation return result 212 indicates to the prepaid service node 106 to arm one or more subscriber based triggers at the originating mobile switching center 102.

In one example, the call setup 208 doesn't include the dialed digit string (e.g., "OCN-XXX"). So, upon receipt of the search operation return result 212, the prepaid service node 106 sends a ConnectResource message 213 to the originating mobile switching center 102. The ConnectResource message 213 causes a bearer channel (e.g., voice trunk) to be set up and is used to gain potentially lost information, such as the dialed digit string, or to obtain additional information, such as a personal identification code. The prepaid service node 106 in one example may perform the search operation 211 and the ConnectResource message 213 contemporaneously.

Upon receipt of the ConnectResource message 213, the originating mobile switching center 102 initiates a call setup 214 to the prepaid service node 106. The call setup 214 to the prepaid service node 106 in one example checks to see if the account balance associated with the prepaid mobile communication device 110 has a sufficient balance to fund the call. If additional time is necessary for the connection between the prepaid service node 106 and the originating mobile switching center 102, then the prepaid service node

106 may send a ResetTimer 216 to the originating mobile switching center 102. The ResetTimer 216 in one example allows another thirty seconds for the connection.

Upon receipt of the call setup 214, the prepaid service node 106 sends an initial trigger response 218 to the originating mobile switching center 102. The initial trigger response 218 in one example comprises an analyzed return result message that indicates to the originating mobile switching center 102 to redirect the call. For example, the originating mobile switching center 102 interprets the initial trigger response 218 to be a redirection request for redirection of the call to the directory assistance service node 108. The initial trigger response 218 comprises a digit string associated with the directory assistance service node 108. For example, the initial trigger response 218 comprises a termination list ("Termlist") set to "411PAY." Thus, upon receipt of a call with the termination list of "411PAY," the directory assistance service node 108 knows the call is from a prepaid subscriber, such as the prepaid mobile communication device 110.

The prepaid service node 106 employs the initial trigger response 218 to arm one or more triggers at the originating mobile switching center 102. For example, the triggers may comprise one or more switch based triggers and/or one or more subscriber based triggers. The subscriber based triggers in one example comprise one or more of Origination_Attempt_Authorized, Collected_Information, and Analyzed_Information triggers. For example, the subscriber based triggers are detected at the Origination_Attempt_Authorized, Collected_Information, and Analyzed_Information detection points. The originating mobile switching center 102 in one example encounters one or more of the subscriber based triggers prior to encountering a Calling_Routing_Addresss_Available trigger.

The one or more triggers support one or more services for the prepaid mobile communication device 110. For example, the one or more triggers allow the call to be sent to the directory assistance service node 108 to provide directory assistance service to the prepaid mobile communication device 110. In one example, the initial trigger response 218 comprises the termination list. For example, the termination list arms one or more switch based triggers at the originating mobile switching center 102. In another example, the initial trigger response 218 comprises a TriggerAddressList. The TriggerAddressList in one example comprises Calling_Routing_Addresss_Available, OAnswer, Odisconnect, and All_Calls triggers. For example, the initial trigger response 218 arms one or more subscriber based triggers at the originating mobile switching center 102. The initial trigger response 218 may comprise a service identification to indicate the involvement of the prepaid service node 106 on the call. "ServiceID1" serves to represent the service identification associated with the prepaid service node 104.

Figure 3:
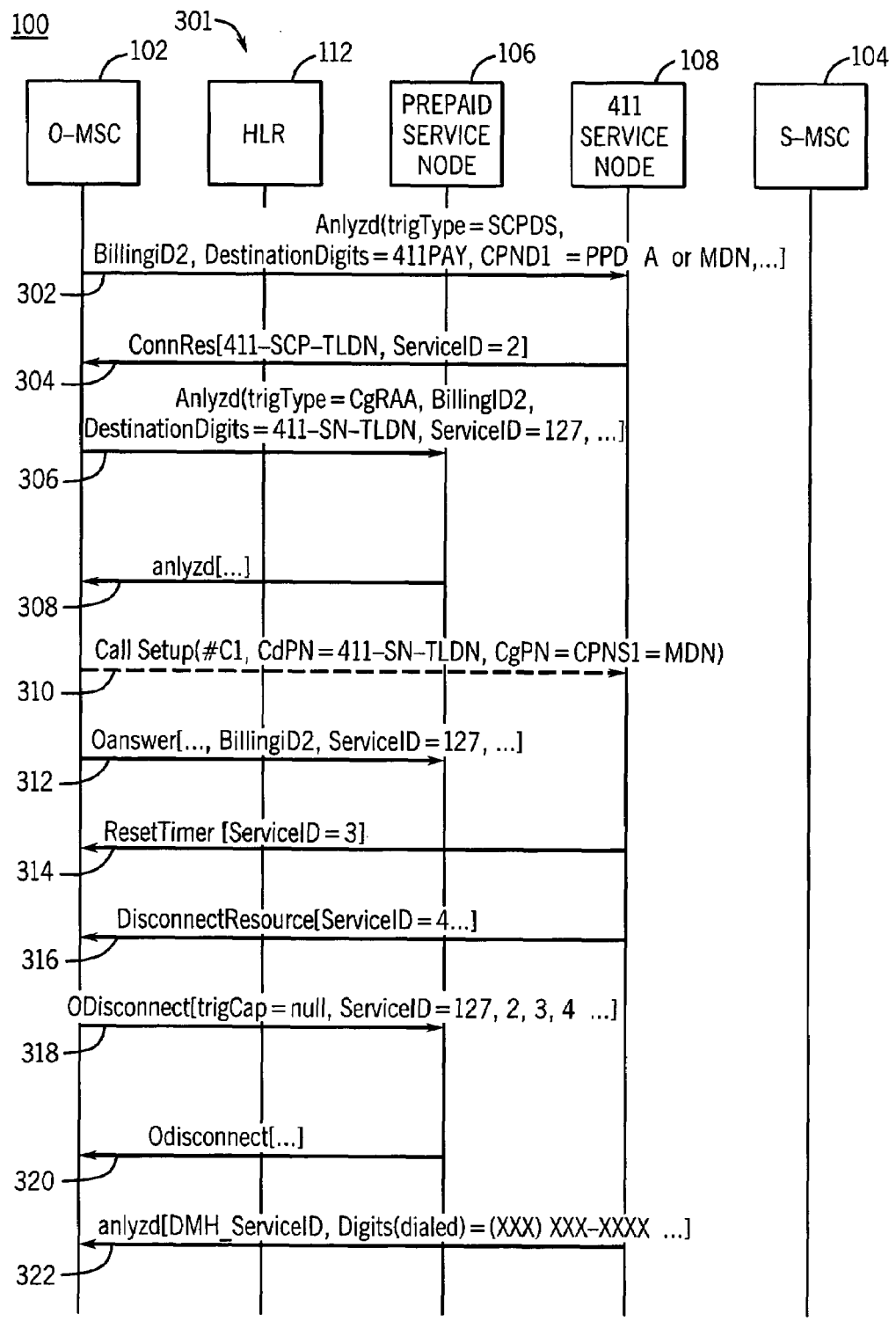
FIG. 3 continues where FIG. 2 ended and is a representation of one exemplary message flow for triggering a call to a directory assistance service node of the one or more service nodes of the apparatus of FIG. 1.

Referring to FIGS. 1 and 3, a message flow 301 represents an exemplary triggering of the call to the directory assistance service node 108. The message flow 301 continues where the message flow 201 (FIG. 2) ended. For example, the originating mobile switching center 102 has received the redirection request, for example, the initial trigger response 218 (FIG. 2) and the call is ready to be setup to the directory assistance service node 108.

Upon receipt of a digit string associated with the directory assistance service node 108 in the redirection request, the originating mobile switching center 102 triggers the call to the directory assistance service node 108. For example, the originating mobile switching center 102 encounters a dialed digit trigger based on the digit string. Upon encountering the dialed digit trigger, the originating mobile switching center 102 sends an AnalyzedInformation operation 302 to the directory assistance service node 108.

Upon receipt of the AnalyzedInformation operation 302, the directory assistance service node 108 sends a ConnectResource message 304 to the originating mobile switching center 102. The ConnectResource message 304 indicates to the originating mobile switching center 102 to setup a temporary connection with the directory assistance service node 108. The ConnectResource message 304 comprises a service identification to indicate to the originating mobile switching center 102 that the directory assistance service node 108 was involved on the call. "ServiceID=2" serves to represent the service identification associated with the directory assistance service node 108.

Since the initial trigger response 218 (FIG. 2) armed the CgRAA trigger, upon receipt of the ConnectResource message 304, the originating mobile switching center 102 sends an AnalyzedInformation operation 306 to the prepaid service node 106. For example, the originating mobile switching center 102 encounters a CgRAA trigger and sends the AnalyzedInformation operation 306 to the prepaid service node 106.

The AnalyzedInformation operation 306 communicates to the prepaid service node 106 that a call is being set up to the directory assistance service node 108. The AnalyzedInformation operation 306 comprises DestinationDigits so that the prepaid service node 106 may calculate rating for the call to the directory assistance service node 108. The AnalyzedInformation operation 306 passes a service identification (e.g., ServiceID=127) to the prepaid service node 104 to distinguish the intelligent peripheral call from a standard call.

Upon receipt of the AnalyzedInformation operation 306, the prepaid service node 104 sends an analyzed return result message 308 to the originating mobile switching center 102 to allow the call to continue to the directory assistance service node 108. The originating mobile switching center 102 will then set up a call 310 to the digits of the directory assistance service node 108 specified in the ConnectResource message 304. The directory assistance service node 108 answers the call 310 and interacting with the calling party of the prepaid mobile communication device 110 will locate a telephone number based on an inquiry from the user of the prepaid mobile communication device 110. "(XXX) XXX-XXXX" serves to represent the telephone number.

Since the initial trigger response 218 (FIG. 2) armed the OAnswer trigger, after the call 310 is answered, the originating mobile switching center 102 sends the OAnswer trigger message 312 to the prepaid service node 106. The OAnswer trigger message 312 communicates to the prepaid service node 106 that the call to the directory assistance service node 108 has been answered. The OAnswer trigger message 312 passes the ServiceID=127 to the prepaid service node 106 to distinguish the intelligent peripheral call from a standard call.

If additional time is necessary for the connection with the directory assistance service node 108, the directory assistance service node 108 may send a ResetTimer 314 to the originating mobile switching center 102. The ResetTimer 314 allows another thirty seconds for the connection between the originating mobile switching center 102 and the directory assistance service node 108. The ResetTimer 314 comprises a service identification to indicate to the originating mobile switching center 102 that the ResetTimer 314 was activated for the connection with the directory assistance service node 108. "ServiceID=3" serves to represent the service identification associated with the ResetTimer 314 and can also be used to identify an additional service provided to the prepaid mobile communication device 110. For example, the prepaid mobile communication device 110 may receive a horoscope before requesting for directory assistance from the directory assistance service node 108.

The directory assistance service node 108 interacts with the prepaid mobile communication device 110 over the call 310, as needed, by sending multiple ResetTimer analogous to the ResetTimer 314. Upon completion of the interactions, the directory assistance service node 108 sends a DisconnectResource message 316 to the originating mobile switching center 102. The DisconnectResource message 316 serves to release the connection between the originating mobile switching center 102 and the directory assistance service node 108. The DisconnectResource message 316 may comprise one or more service identifications that indicate to the originating mobile switching center 102 services used by the prepaid mobile communication device 110. "ServiceID=4" serves to represent the one or more service identifications.

Since the initial trigger response 218 (FIG. 2) armed the Odisconnect trigger, upon encountering the Odisconnect trigger, the originating mobile switching center 102 sends an Odisconnect trigger message 318 to the prepaid service node 106. The Odisconnect trigger message 318 communicates to the prepaid service node 104 that the call to the directory assistance service node 108 has been disconnected. The Odisconnect trigger message 318 passes the ServiceID=127 to the prepaid service node 104 to distinguish the intelligent peripheral call from a standard call.

The originating mobile switching center 102 includes the service identifications in the Odisconnect trigger message 318 to the prepaid service node 106. The Odisconnect trigger message 318 sends an indication of the services used by the prepaid mobile communication device 110. For example, the Odisconnect trigger message 318 may comprise one or more of ServiceID=1, Service ID=2, ServiceID=3, and ServiceID=4. The prepaid service node 106 employs the service identifications to calculate billing information based on the use of the one or more service nodes 106, 108, and 109 by the prepaid mobile communication device 110. The Odisconnect trigger message 318 may indicate one or more billing parameters, such as, the service identifications, one or more billing rates, and one or more call durations. For example, the Odisconnect trigger message 318 may provide an indication to the prepaid service node 106 of a duration of the connections with the directory assistance service node 108. The prepaid service node 106 calculates an amount to deduct from an account balance associated with the prepaid mobile communication device 110.

The prepaid service node 106 sends an Odisconnect return result 320 to the originating mobile switching center 102 to allow the call to continue at the originating mobile switching center 102. In response to the inquiry from the user of the prepaid mobile communication device 110, the directory assistance service node 108 sends an analyzed return result message 322 to the originating mobile switching center 102. The analyzed return result message 322 comprises an indication of the telephone number (XXX) XXX-XXXX. The analyzed return result message 322 closes the transaction started by the AnalyzedInformation operation 302. The analyzed return result message 322 comprises parameters to change the destination digits, thereby redirecting the call to the telephone number (XXX) XXX-XXXX.

Figure 4:
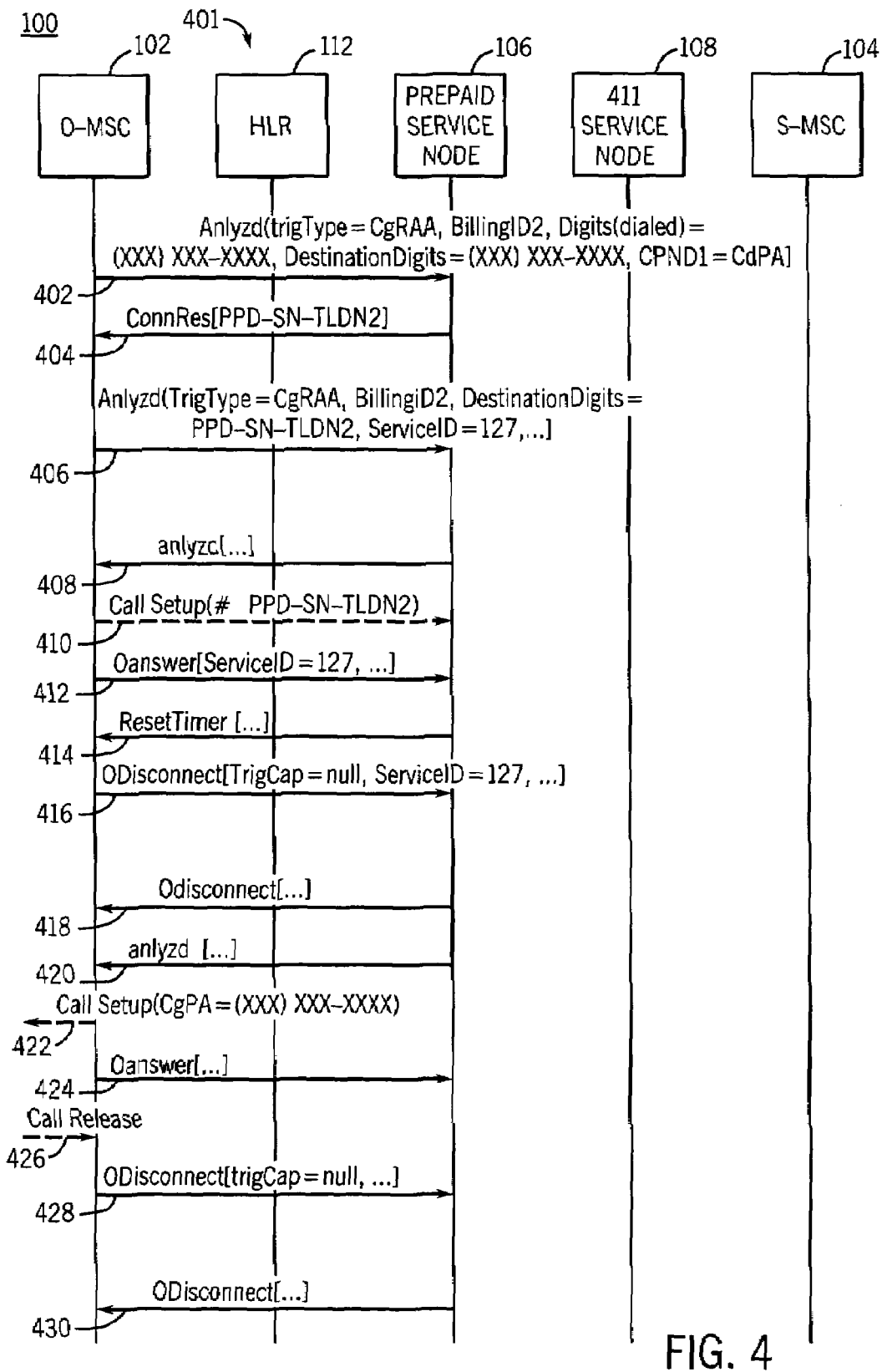
FIG. 4 continues where FIG. 3 ended and is a representation of one exemplary message flow for a connection of a prepaid mobile communication device of the one or more mobile communication devices with a location associated with destination digits received from a directory assistance service node of the one or more service nodes of the apparatus of FIG. 1.

Referring to FIGS. 1 and 4, a message flow 401 represents an exemplary connection of the prepaid mobile communication device 110 with a location associated with the destination digits received from the directory assistance service node 108. The message flow 401 continues where the message flow 301 (FIG. 3) ended. For example, the transaction with the directory assistance service node 108 has ended and the call is ready to be setup to the destination digits (XXX) XXX-XXXX.

In order to charge every call, the CgRAA trigger is armed at the originating mobile switching center 102 for delivery to the prepaid service node 106. The CgRAA trigger message 402 comprises routing information parameters, such as the destination digits (XXX) XXX-XXXX. The prepaid service node 106 employs the routing information parameters to properly rate the call. For example, the prepaid service node 104 employs the routing information parameters to calculate billing information associated with the call. The CgRAA trigger message 402 gives the prepaid service node 106 control of the call.

Once the prepaid service node 106 gains control of the call, the prepaid service node 106 may send a ConnectResource message 404 to the originating mobile switching center 102. The ConnectResource message 404 directs the originating mobile switching center 102 to set up a temporary connection to the prepaid service node 106. The connection with the prepaid service node 106 provides the prepaid mobile communication device 110 with customized balance announcements and interactions.

In one example, upon receipt of the ConnectResource message 404, the originating mobile switching center 102 sends a CgRAA trigger message 406 to the prepaid service node 106. The prepaid service node 106 sends an analyzed return result message 408 to the originating mobile switching center 102 to allow the originating mobile switching center 102 to continue the call. In another example, the originating mobile switching center 102 determines to not send the CgRAA trigger message 406. For example, the originating mobile switching center 102 may determine to not send the CgRAA trigger message 406 because the CgRAA trigger message 406 would be communicating information already known by the prepaid service node 106 back to the prepaid service node 106.

To determine whether to send the CgRAA trigger message 406, the originating mobile switching center 102 in one example compares the TAL destination for the CgRAA trigger that was received in the initial trigger response 218 (FIG. 2) and the address for the trigger that encapsulates the CgRAA trigger message 406. For example, the originating mobile switching center 102 compares an address associated with a received service identification and a trigger destination address for a destination to send the received service identification. If the address associated with the service identification is the same as the trigger destination address, then the originating mobile switching center 102 determines to not send the service identification to the trigger destination address. If the trigger address of the a trigger matches the TriggerAddress of the trigger as armed in the TAL, then the originating mobile switching center 102 does not send the trigger to the TriggerAddress.

To connect with the prepaid service node 106, the originating mobile switching center 102 sets up a call 410 to the prepaid service node 106. For example, the prepaid service node 106 plays prepaid pre-call announcement balance and account options for the prepaid mobile communication device 110 through the originating mobile switching center 102. After the call 410 is answered, the originating mobile switching center 102 encounters the OAnswer trigger. The originating mobile switching center 102 sends an OAnswer trigger message 412 to the destination provisioned in the initial trigger response 218 (FIG. 2). For example, the originating mobile switching center 102 sends the OAnswer trigger message 412 to the prepaid service node 106. The OAnswer trigger message 412 communicates to the prepaid service node 106 that the call 410 has been answered.

If additional time on the connection with the prepaid service node 106 is necessary, the prepaid service node 106 may send a ResetTimer 414 to the originating mobile switching center 102. The ResetTimer 414 provides another thirty seconds for the ConnectResource message 404 connection. Also, the ResetTimer 414 may also be sent with a ServiceID to indicate use of an additional service by the prepaid mobile communication device 110.

After the call 410 to the prepaid service node 106 is disconnected, then the originating mobile switching center 102 encounters the ODisconnect trigger. The originating mobile switching center 102 sends an ODisconnect trigger message 416 to the prepaid service node 106. The ODisconnect trigger message 416 communicates to the prepaid service node 106 that the call to the prepaid service node 106 has been disconnected. Any service identifications received at the originating mobile switching center 102 during the connection with the prepaid service node 106 are sent to the prepaid service node 106 in the ODisconnect trigger message 416. For example, the ODisconnect trigger message 416 comprises ServiceID=127 so that the prepaid service node 104 can bill for the service associated with ServiceID=127. If the OAnswer trigger message 412 and the ODisconnect trigger message 416 are communicating information from the prepaid service node 106 through the originating mobile switching center 102 and back to the prepaid service node 106, then the originating mobile switching center 102 could avoid sending the OAnswer trigger message 412 and the ODisconnect trigger message 416.

Upon receipt of the ODisconnect trigger message 416, the prepaid service node 106 sends an Odisconnect return result 418 to the originating mobile switching center 102 to allow the call to continue at the originating mobile switching center 102. The prepaid service node 106 is done playing announcements for the prepaid mobile communication device 110. Thus, the prepaid service node 106 sends an analyzed return result message 420 to the originating mobile switching center 102. The analyzed return result message 420 closes the transaction with the prepaid service node 106 started by the CgRAA trigger message 402. The analyzed return result message 420 may comprise parameters to affect the service identifications recorded in the AMA record of the originating mobile switching center 102.

The analyzed return result message 420 returns control of the communication session to the originating mobile switching center 102. The originating mobile switching center 102 sets up a call 422 to the location associated with the destination digits (XXX) XXX-XXXX. For example, the originating mobile switching center 102 sends the call 422 out to the public switched telephone network 114. The public switched telephone network 114 delivers the call to a location associated with the destination digits (XXX) XXX-XXXX. Once the call 422 is answered, the originating mobile switching center 102 sends an OAnswer trigger message 424 to the prepaid service node 106. Once the call 422 is disconnected 426, the originating mobile switching center 102 sends an ODisconnect trigger message 428 to the prepaid service node 106. The OAnswer trigger message 424 and the Odisconnect trigger message 428 allow the prepaid service node 106 to charge for the call 422 to (XXX) XXX-XXXX. Upon receipt of the Odisconnect trigger message 428, the prepaid service node 106 sends an Odisconnect return result message 430 to the originating mobile switching center 102 to end the triggered transactions.

Figure 5:
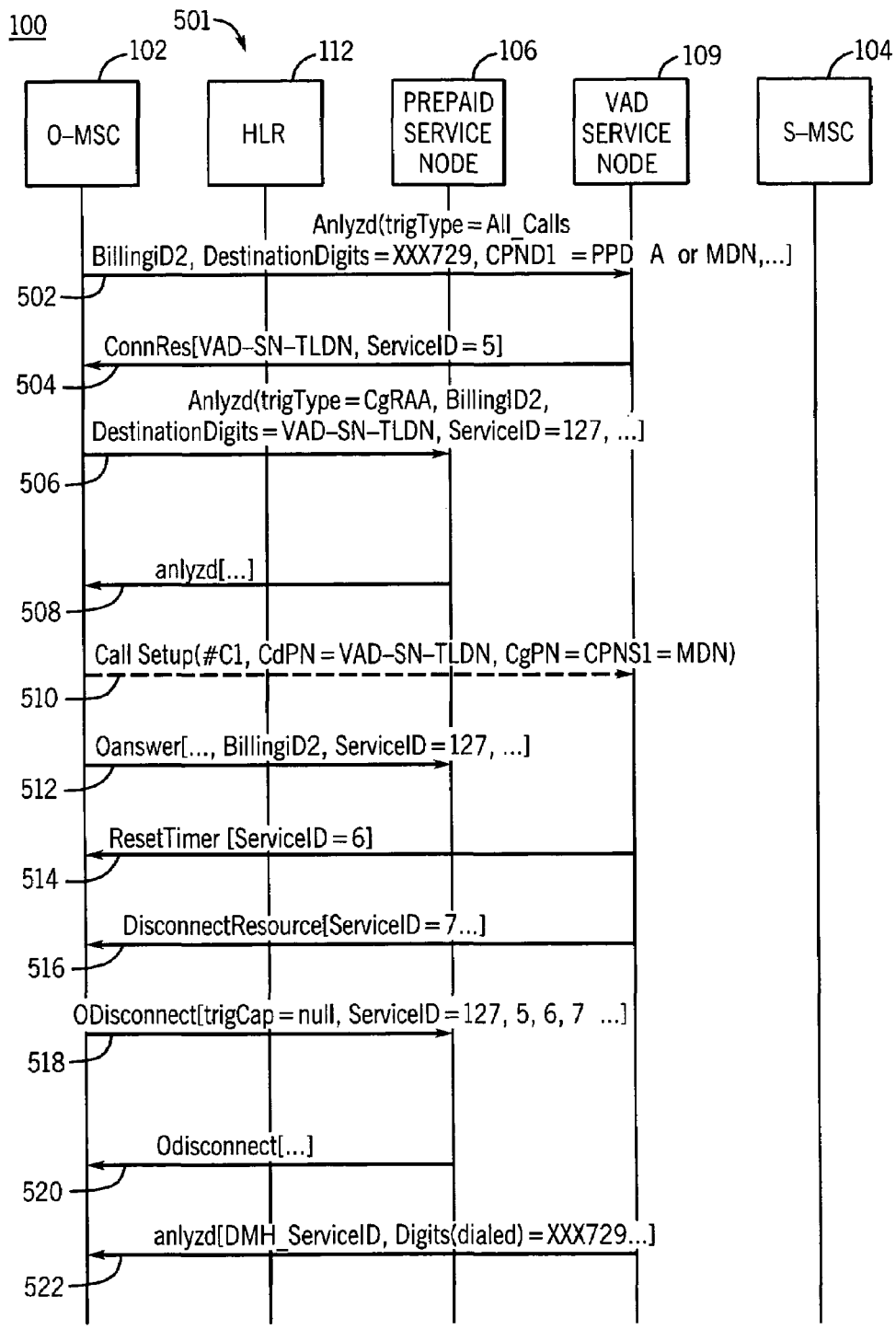
FIG. 5 is a representation of one exemplary message flow that may optionally occur between the message flows of FIGS. 2 and 3 for triggering a call to a voice activated dialing service node of the one or more service nodes of the apparatus of FIG. 1.

Referring to FIGS. 1 and 5, a message flow 501 represents an exemplary triggering of the call to the voice activated dialing service node 109. The message flow 501 continues where the message flow 201 (FIG. 2) ended. For example, the originating mobile switching center 102 has received the redirection request, for example, the initial trigger response 218 (FIG. 2) and the call is ready to be triggered to the voice activated dialing service node 109.

In one example, the originating mobile switching center 102 triggers call to the voice activated service node 109 prior to triggering the call to the directory assistance service node 108. For example, the call is triggered to the voice activated service node 109 and the user of the prepaid mobile communication device verbally requests connection to the directory assistance service node 108. Thus, the message flow 501 in one example may occur between the message flow 201 (FIG. 2) and the message flow 301 (FIG. 3). Upon receipt of the initial trigger response 218 (FIG. 2), the originating mobile switching center 102 encounters the All_Calls trigger with a destination of the voice activated dialing service node 109 and sends an AnalyzedInformation operation 502 to the voice activated dialing service node 109.

Upon receipt of the AnalyzedInformation operation 502, the originating mobile switching center 102 and the voice activated dialing service node 109 set up a service node connection analogously to the message flow 301 (FIG. 3). For example, the voice activated dialing service node 109 sends a ConnectResource message 504 to the originating mobile switching center 102. The ConnectResource message 504 indicates to the originating mobile switching center 102 to setup a temporary connection with the voice activated dialing service node 109. The ConnectResource message 504 comprises a service identification to indicate to the originating mobile switching center 102 that the voice activated dialing service node 109 was involved on the call. "ServiceID=5" serves to represent the service identification associated with the voice activated dialing service node 109.

Since the initial trigger response 218 (FIG. 2) armed the CgRAA trigger, upon receipt of the ConnectResource message 504, the originating mobile switching center 102 sends an AnalyzedInformation operation 506 to the prepaid service node 106. For example, the originating mobile switching center 102 encounters a CgRAA trigger and sends the AnalyzedInformation operation 506 to the prepaid service node 106.

The AnalyzedInformation operation 506 communicates to the prepaid service node 106 that a call is being set up to the voice activated dialing service node 109. The AnalyzedInformation operation 506 comprises DestinationDigits so that the prepaid service node 106 may calculate rating for the call to the voice activated dialing service node 109. The AnalyzedInformation operation 506 passes a service identification (e.g., ServiceID=127) to the prepaid service node 104 to distinguish the intelligent peripheral call from a standard call.

Upon receipt of the AnalyzedInformation operation 506, the prepaid service node 104 sends an analyzed return result message 508 to the originating mobile switching center 102 to allow the call to continue to the voice activated dialing service node 109. The originating mobile switching center 102 will then set up a call 510 to the digits of the voice activated dialing service node 109 specified in the ConnectResource message 504. The voice activated dialing service node 109 will provide a telephone number to the originating mobile switching center 102 based on an inquiry from the user of the prepaid mobile communication device 110. "XXX729" serves to represent the telephone number.

Since the initial trigger response 218 (FIG. 2) armed the OAnswer trigger, after the call 510 is answered, then the originating mobile switching center 102 encounters the OAnswer trigger. The originating mobile switching center 102 sends an OAnswer trigger message 512 to the prepaid service node 106. The OAnswer trigger message 512 communicates to the prepaid service node 106 that the call to the voice activated dialing service node 109 has been answered. The OAnswer trigger message 512 passes the ServiceID=127 to the prepaid service node 106 to distinguish the intelligent peripheral call from a standard call.

If additional time is necessary for the connection with the voice activated dialing service node 109, the voice activated dialing service node 109 may send a ResetTimer 514 to the originating mobile switching center 102. The ResetTimer 514 allows another thirty seconds for the connection between the originating mobile switching center 102 and the voice activated dialing service node 109. The ResetTimer 514 comprises a service identification to indicate to the originating mobile switching center 102 that the ResetTimer 514 was activated for the connection with the voice activated dialing service node 109. "ServiceID=6" serves to represent the service identification associated with the ResetTimer 514 and can also be used to identify an additional service provided to the prepaid mobile communication device 110.

The voice activated dialing service node 109 sends a DisconnectResource message 516 to the originating mobile switching center 102. The DisconnectResource message 516 serves to release the connection between the originating mobile switching center 102 and the voice activated dialing service node 109. The DisconnectResource message 516 may comprise one or more service identifications that indicate to the originating mobile switching center 102 services used by the prepaid mobile communication device 110. "ServiceID=7" serves to represent the one or more service identifications.

Since the initial trigger response 218 (FIG. 2) armed the Odisconnect trigger message 518, upon encountering the Odisconnect trigger message 518, the originating mobile switching center 102 sends the Odisconnect trigger message 518 to the prepaid service node 106. The Odisconnect trigger message 518 communicates to the prepaid service node 104 that the call to the voice activated dialing service node 109 has been disconnected. The Odisconnect trigger message 518 passes the ServiceID=127 to the prepaid service node 104 to distinguish the intelligent peripheral call from a standard call.

The originating mobile switching center 102 includes the service identifications in the Odisconnect trigger message 518 to the prepaid service node 106. The Odisconnect trigger message 518 sends an indication of the services used by the prepaid mobile communication device 110. For example, the Odisconnect trigger message 518 may comprise one or more of ServiceID=127, ServiceID=5, ServiceID=6, and ServiceID=7. The prepaid service node 106 employs the service identifications to calculate billing information based on the use of the one or more service nodes 106, 108, and 109 by the prepaid mobile communication device 110. The Odisconnect trigger message 518 may indicate one or more billing parameters, such as, the service identifications, one or more billing rates, and one or more call durations. For example, the Odisconnect trigger message 518 may provide an indication to the prepaid service node 106 of a duration of the connections with the voice activated dialing service node 109. The prepaid service node 106 calculates an amount to deduct from an account balance associated with the prepaid mobile communication device 110.

The prepaid service node 106 sends an Odisconnect return result 520 to the originating mobile switching center 102 to allow the call to continue at the originating mobile switching center 102. In response to the inquiry from the user of the prepaid mobile communication device 110, the voice activated dialing service node 109 sends an analyzed return result message 522 to the originating mobile switching center 102. The analyzed return result message 522 comprises an indication of the telephone number "XXX729". The analyzed return result message 522 closes the transaction started by the AnalyzedInformation operation 502. The analyzed return result message 522 comprises parameters to change the destination digits, thereby redirecting the call to the telephone number "XXX729".

The apparatus 100 in one example comprises a plurality of components such as electronic components, computer hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. One example of a computer-readable signal-bearing medium for the apparatus 100 comprises one or more instances of the recordable data storage medium of one or more of the originating mobile switching center 102, the serving mobile switching center 104, and the service nodes 106, 108 and 109. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("PLAN"), the internet, and a wireless network.

The steps or operations described herein are just exemplary. The message flows 201 (FIG. 2), 301 (FIG. 3), 401 (FIG. 4), and 501 (FIG. 5) illustrate an exemplary employment of wireless intelligent network ("WIN") signaling. It will be apparent to those skilled in the relevant art that similar functionality can be achieved using protocols, such as Global System for Mobile communications ("GSM")/Customized Applications for Mobile network Enhanced Logic ("CAMEL"), ANSI Capability Set 1 ("CS-1"), International telecommunication union ("ITU-T") CS-1, and session initiation protocol ("SIP"), by variations of the steps and operations without departing from the spirit of the invention. For instance, the steps may be performed in a differing order, with similar operations, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   an originating mobile switching center that handles one or more cells;
   a serving mobile switching center coupled to the originating mobile switching center, wherein the serving mobile switching center for a communication device on a call of the one or more calls passes control of the call to the originating mobile switching center; and
   a service node coupled to the originating mobile switching center, wherein the originating mobile switching center triggers the call to the service node, and wherein the service node sends an initial trigger response to the originating mobile switching center that instructs the originating mobile switching center to redirect the call, and wherein the initial trigger response arms one or more triggers that support one or more services for the communication device; and
   wherein the one or more triggers comprise one or more of one or more switch based triggers and one or more subscriber based triggers exclusive of Calling_Routing_Addresss_Available, OAnswer, and ODisconnect triggers; and
   wherein the one or more subscriber based triggers comprise one or more of Origination_Attempt_Authorized, Collected_Information, and Analyzed_Information triggers; and
   wherein the originating mobile switching center encounters the one or more subscriber based triggers prior to the Calling_Routing_Addresss_Available trigger; and
   wherein upon receipt of the initial trigger response, the originating mobile switching center encounters at least one of the one or more triggers and triggers the call to one or more other service nodes.

2. The apparatus of claim 1, wherein the serving mobile switching center does not support the one or more triggers and the originating mobile switching center supports the one or more triggers.

3. The apparatus of claim 1, wherein the communication device comprises a prepaid mobile communication device, and wherein the service node comprises a prepaid service node; and
   wherein the prepaid service node supports billing for the prepaid mobile communication device.

4. The apparatus of claim 3, wherein the originating mobile switching center sends to the prepaid service node one or more service identifications that are associated with at least one of the one or more other service nodes and employable by the prepaid service node to calculate billing information based on use of the at least one of the one or more other service nodes by the prepaid mobile communication device.

5. The apparatus of claim 3, wherein at least one of the one or more other service nodes provide at least one of the one or more services to the prepaid mobile communication device; and
   wherein the originating mobile switching center sends to the prepaid service node one or more service identifications that are associated with the at least one of the one or more services and employable by the prepaid service node to calculate billing information based on receipt of the at least one of the one or more services by the prepaid mobile communication device.

6. The apparatus of claim 3, wherein the one or more other service nodes comprise a directory assistance service node; and
   wherein upon receipt of the initial trigger response, the originating mobile switching center encounters a dialed digits trigger which triggers the call to the directory assistance service node to provide directory assistance service to the prepaid mobile communication device.

7. The apparatus of claim 6, wherein the originating mobile switching center creates a temporary connection between the prepaid mobile communication device and the directory assistance service node for a duration of the directory assistance service; and
   wherein the originating mobile switching center removes the directory assistance service node from a path of the call upon completion of the directory assistance service.

8. The apparatus of claim 1, in combination with the service node and the one or more other service nodes, wherein the communication device comprises a prepaid mobile communication device; and
   wherein at least one of the one or more other service nodes provide at least one of the one or more services to the prepaid mobile communication device on the call; and
   wherein the at least one of the one or more other service nodes send one or more service identifications to the originating mobile switching center to indicate use of the at least one of the one or more other service nodes by the prepaid mobile communication device.

9. The apparatus of claim 8, wherein the service node comprises a prepaid service node; and
   wherein the originating mobile switching center sends the one or more service identifications, one or more billing rates, and one or more call durations to the prepaid service node for employment by the prepaid service node to calculate an amount to deduct from an account balance associated with the prepaid mobile communication device.

10. The apparatus of claim 8, wherein the one or more services comprise one or more triggered services; and
    wherein the service node sends the initial trigger response to the originating mobile switching center to arm the one or more triggers at the originating mobile switching center so the originating mobile switching center is able to provide access to the one or more triggered services.

11. The apparatus of claim 1, wherein the one or more triggers comprise one or more first switch based triggers, and wherein the originating mobile switching center is pre-provisioned with one or more second switch based triggers; and
    wherein the initial trigger response arms one or more subscriber based triggers at the originating mobile switching center.

12. The apparatus of claim 1, in combination with the service node, wherein the service node comprises a first service node, and wherein the one or more other service nodes comprise a second service node, and wherein the first service node receives destination digits for the call; and
    wherein the first service node changes the destination digits into a digit string associated with the second service node and sends the initial trigger response to the originating mobile switching center.

13. The apparatus of claim 1, wherein the initial trigger response comprises a Specific_Called_Party Digit_String Termination AnalyzedInformation operation return result message, and wherein the Specific_Called_Party_Digit_

String Termination AnalyzedInformation operation return result message comprises an indication to arm the one or more triggers and a termination list set to redirect the call to one or more of the one or more other service nodes.

14. The apparatus of claim 1, wherein the service node requests a list of the one or more triggers from a home location register; and
wherein the service node sends the list of the one or more triggers in the initial trigger response to the originating mobile switching center.

15. A method, comprising the steps of:
receiving control of a call at an originating mobile switching center from a serving mobile switching center;
triggering the call to a service node that employs an initial trigger response to arm one or more triggers, wherein the one or more triggers compare one or more of one or more switch based triggers and one or more subscriber based triggers exclusive of Calling_Routing_Addresss_Available, OAnswer, and ODisconnect triggers, and wherein the one or more subscriber based triggers comprise one or more of Origination_Attempt_Authorized, Collected_Information, and Analyzed_Information triggers,
encountering at the originating mobile switching center the one or more subscriber based triggers prior to the Calling_Routing_Addresss_Available trigger;
encountering at least one of the one or more triggers associated with one or more other service nodes; and
triggering the call to at least one of the one or more other service nodes upon receipt of the initial trigger response.

16. The method of claim 15, wherein the initial trigger response comprises an indication of one or more subscriber based triggers, the method further comprising the step of:
arming the one or more subscriber based triggers for one or more services indicated in the initial trigger response.

17. The method of claim 15, wherein the service node comprises a prepaid service node, the method further comprising the step of:
sending to the prepaid service node one or more service identifications that are associated with one or more of the one or more other service nodes and employable by the prepaid service node to calculate billing information based on use of the one or more of the one or more other service nodes by a prepaid mobile communication device.

18. The method of claim 17, wherein the one or more other service nodes comprises a directory assistance service node, and wherein the step of encountering the at least one of the one or more triggers associated with the one or more other service nodes comprises the step of:
encountering a dialed digits trigger with a destination of the directory assistance service node upon receipt of the initial trigger response;
wherein the step of triggering the call to the at least one of the one or more other service nodes upon receipt of the initial trigger response comprises the step of:
triggering the call to the directory assistance service node to provide directory assistance service to the prepaid mobile communication device.

19. The method of claim 18, wherein the step of triggering the call to the directory assistance service node to provide directory assistance service to the prepaid mobile communication device comprises the steps of:
creating a temporary connection between the prepaid mobile communication device and the directory assistance service node for a duration of the directory assistance service; and
removing the directory assistance service node from a path of the call upon completion of the directory assistance service.

20. The method of claim 15, wherein the step of encountering the at least one of the one or more triggers associated with the one or more other service nodes comprises the step of:
receiving an Specific_Called_Party_Digit_String Termination AnalyzedInformation operation return result message that comprises an indication to arm the one or more triggers and a termination list set to redirect the call to at least one of the one or more other service nodes to provide one or more services to a communication device.

21. An apparatus, comprising:
an originating mobile switching center that handles one or more calls;
a serving mobile switching center coupled to the originating mobile switching center, wherein the serving mobile switching center for a communication device on a call of the one or more calls passes control of the call to the originating mobile switching center; and
a service node coupled to the originating mobile switching center, wherein the originating mobile switching center triggers the call to the service node, and wherein the service node sends an initial trigger response to the originating mobile switching center that instructs the originating mobile switching center to redirect the call, and wherein the initial trigger response arms one or more triggers that support one or more services for the communication device; and
wherein the one or more triggers comprise one or more of Calling_Routing_Addresss_Available, OAnswer, and ODisconnect triggers; and
wherein the originating mobile switching center encounters one or more subscriber based triggers prior to the Calling_Routing_Addresss_Available trigger; and
wherein upon receipt of the initial trigger response, the originating mobile switching center encounters one or more of the one or more triggers and triggers the call to one or more other service nodes.

* * * * *